Hopper & Gratz,
Gas Meter,
No. 750.
Reissued June 28, 1859.
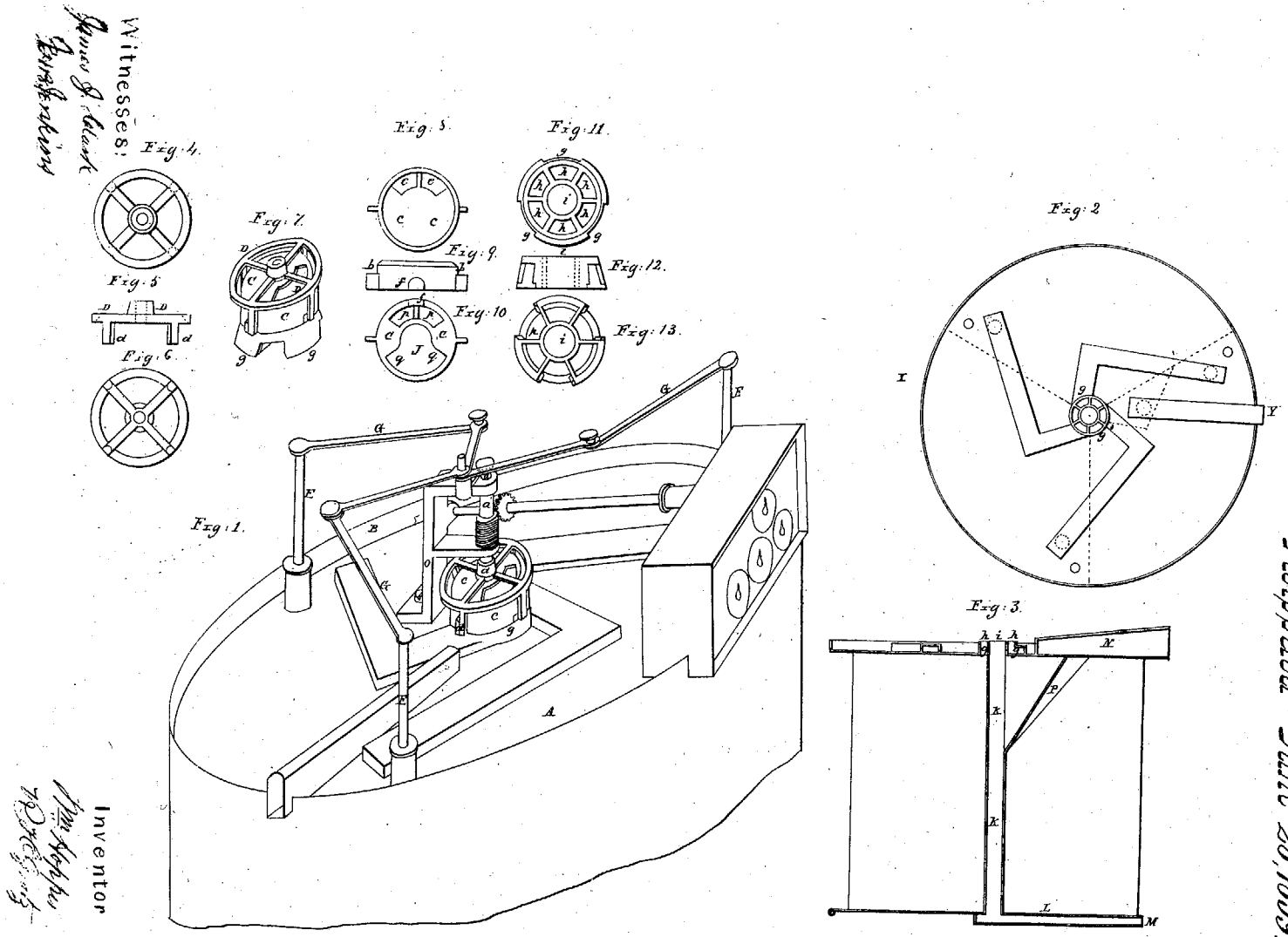
Witnesses:
James J. Clark
Ezra Jenkins
Inventor
Wm. Hopper
Wm. H. Gratz

UNITED STATES PATENT OFFICE.

WILLIAM HOPPER AND ROBERT H. GRATZ, OF PHILADELPHIA, PENNSYLVANIA, ASSIGNEES OF CHARLES C. LLOYD.

IMPROVEMENT IN VALVES FOR DRY GAS-METERS.

Specification forming part of Letters Patent No. 20,680, dated June 22, 1858; Reissue No. 750, dated June 28, 1859.

*To all whom it may concern:*

Be it known that CHARLES C. LLOYD, of the city of Philadelphia, and State of Pennsylvania, has invented a new and useful Improvement in the Construction of Dry Gas-Meters; and we do hereby declare the following to be a full and exact description of the same, reference being had to the annexed drawings, making a part of this specification, in which—

Figure 1 is a perspective view of the gallery or upper part of the gas-meter. Fig. 2 is a view of the seat of the gallery, showing the channels and valve-seat, more particularly described hereinafter. Fig. 3 is a vertical section through the meter-case on the line X Y of Fig. 2. Figs. 4, 5, 6 show the valve-carriage detached, as described hereinafter. Fig. 7 shows the carriage, valve-seat, and valve in their proper relative position. Figs. 8, 9, 10 are different views of the valve. Figs. 11, 12, and 13 are different views of the valve-seat.

The invention of said LLOYD relates to the mode of constructing and operating the valve of the dry meter so as to cause the valve to keep the valve-seat free from deposit, and also so as to cause the rotary motion to be always imparted to it in the plane parallel to that in which it is to be rotated.

A B represents the lower surface or bottom of the gallery of the gas-meter. *c c* represent a circular valve, by which the gas is caused to pass into and out of the six compartments of the meter by which it is measured. Fig. 8 shows a top view of this valve *c c* detached, showing the two passages *e e'*, for the gas to escape alternately from one or the other cell into the gallery of the meter, whence it passes to supply the burners. Fig. 9 is a side view of the valve *c c*, showing the notch or break *f*. This notch is intended to break the continuity of the lower surface of the valve *c c*, as shown by Fig. 10, which represents the valve *c c* inverted. This valve *c c* rests upon a seat, *g g'*, which is shown in the small top view in Fig. 2 and also detached in Fig. 11. This valve-seat is circular, and corresponding in size with the lower surface of the valve *c c*, as shown at Fig. 10. The series of passages *h h h* lead to or from the interior of the cells, according to the position of the valve on its seat.

Fig. 12 is a vertical sectional view of the valve-seat, and Fig. 13 an inverted view of the valve-seat.

When the valve *c c* is placed upon the valve-seat *g g*, as shown in its proper relative position in Fig. 1, the lower surface of the valve *c c* fits accurately to and slides upon the seat, except at the notch *f*. The edge of this notch *f*, being a square corner or sharp edge, scrapes or removes the resinous or other deposit, which would otherwise remain and collect upon the seat, causing the valve to rise from the seat and thereby leak. In like manner the edges at *p p* scrape the surfaces of the radial divisions between *h h h* in the valve-seat, as in Fig. 11, and the edges of *q q* aid *p p* in doing this, and also scrape and clear the surface of the valve-seat immediately surrounding the central aperture, *i*.

Connected with the central or supply passage, *i*, of the valve-seat *g g*, Fig. 3, there is a drip, *k*, which is a vertical tube, extending to the bottom of the meter and discharging into a horizontal table, L, which is closed at its extremity M by a screw-cap.

The gas enters from the main through the inlet-pipe to N, from which it passes by the funnel P into the vertical tube *k*, and thence up through the central aperture *i* in the valve-seat and into the central part, J, of the valve, and thence it passes alternately through one or the other of the passages *h h h* into the compartments of the meter. As the gas passes into the tube K and thence into the valve, any vapors which may be condensed into the gas on its entrance to the meter will be conveyed by the vertical tube *k* and collect in the passage L, and can be removed therefrom at intervals by opening the screw-cap at M. The removal of these condensed vapors prevents the accumulation of liquid in the meter, which would be liable to freeze and otherwise interfere with the accurate action of the meter.

The rotary movement is imparted to the valve by means of a circular carriage, D D, having vertical projections *d d d*, which fit against the horizontal lugs or projections *b b* of the valve. This carriage is shown in top view at Fig. 4, in vertical section at Fig. 5, and an inverted view at Fig. 6.

Fig. 7 shows a view of the valve-seat and valve-carriage in their proper positions. The valve-carriage is connected at the center of its upper surface by a small shaft or spindle, *a a*, which revolves through small journals in the two arms of the king-post O. A crank is attached to the upper extremity of the shaft, from which it receives its motion. The carriage being thus suspended independently of the valve and the rotary motion being communicated only through the medium of the projection *d d* and *b b* to the circumference of the valve, it prevents the valve from tilting and causes the rotary motion always to be applied in a plane parallel to the seat.

The construction and arrangement of the valve *c c*, and the passage in the valve-seat *h h h*, are such, that if at any time the independent valve-carriage were to be moved in a reverse direction or backward the immediate effect would be to cut off one of the passages *h h h*, leading to a corresponding chamber. This chamber being thus prevented from permitting the entrance or escape of gas, the diaphragm corresponding to the chamber would be unable to move and the shafts E E E, connecting with the diaphragms, would hold the spiral shaft through the medium of the arms G G G, preventing it from revolving, and thus bring the meter to a stop. This prevents the meter running in a reverse direction, which result was performed in other machines by means of the click and ratchet.

Having thus described the improvement of the said LLOYD, what we claim as his invention, and desire to secure by Letters Patent, as his assignees, is—

1. The construction of the rotary valve *c c* with series of breaks or edges, as at *f*, *p p*, and *q q*, arranged and operating so as to scrape the upper surface of the valve-seat.

2. The drip K and valve-seat *g g*, arranged and operating so as to collect and carry off any liquid deposit in the meter.

3. The valve-carriage D D, arranged and operating substantially as above described.

4. The combination of the valve *c c*, the valve-seat *g g*, the shafts E E E, attached to the diaphragms, arranged and operating as above described for the purpose of restraining a reverse movement in the meter, and thus dispensing with the click and ratchet.

WM. HOPPER.
ROBT. H. GRATZ.

Witnesses:
J. G. MINI CHILD,
JAMES J. CLARK.